United States Patent Office 3,553,063
Patented Jan. 5, 1971

3,553,063
STRENGTHENING CERAMIC ARTICLES
John E. Megles, Corning, N.Y., assignor to Corning Glass Works, Corning, N.Y., a corporation of New York
No Drawing. Filed Dec. 11, 1967, Ser. No. 689,338
Int. Cl. C03c 17/00
U.S. Cl. 161—43
4 Claims

ABSTRACT OF THE DISCLOSURE

This invention relates to the chemical strengthening of sintered ceramic articles of high alumina compositions. The process of the invention comprises contacting a sintered article consisting essentially, by weight, of about 50–70% alumina and 26–50% nepheline syenite, the total of the alumina and nepheline syenite constituting about 88–100% of the article, 0–10% kaolinitic clay, and 0–2% of a mineralizer, with an external source of potassium ions such that the potassium ions diffuse into a surface layer within the article, replacing sodium ions originally present therein, and thereby causing compressive stresses to be set up in the surface layer resulting in an increase in the mechanical strength of the article which, in some instances, is more than twice that of the untreated article.

A recent development in the field of glass technology has been the discovery that the strength of alkali silicate glass articles can be increased as much as several fold through an ion exchange process whereby an integral surface compression layer is induced in a glass article. In general, this ion exchange process consists of contacting an alkali silicate glass article at some elevated temperature, but below the strain point of the glass, with an external source of alkali metal ions having an ionic radius greater than that of the alkali metal ions present in the glass article. This contact causes the replacement of the original alkali metal ions in a surface layer of the glass article with the larger alkali metal ions. Since the exchange or replacement of ions is conducted at temperatures below the strain point of the glass, there is essentially no viscous flow therein and the larger ions are, therefore, actually "crowded" into the sites within the surface layer previously occupied by the smaller original alkali metal ions. This crowding produces compressive stresses and results in the development of an integral surface compression layer in the article which is compensated for by an interior tensile stress portion. British Pat. No. 917,388 is illustrative of such ion exchange reactions resulting from the thermal diffusion of ions and specifically describes the strengthening of soda-lime-silica glass articles through the replacement of sodium ions from the glass surface with potassium ions.

A still more recent development has been the discovery that glass-ceramic articles (represented by U.S. Pat. No. 2,920,971) could also be strengthened through ion exchange processes wherein an integral surface compression layer is formed in the article. French Pat. No. 1,439,341 discloses generally the strengthening of glass-ceramic articles through cation exchange in the crystal phase thereof, one specific example of such involving glass-ceramic articles containing beta-spodumene solid solution as the predominant crystal phase wherein the lithium ions in the crystal are replaced with larger alkali metal ions, commonly sodium ions, thereby developing an integral surface compression layer through the crowding of the larger sodium ion into the site within the crystal previously occupied by the lithium ion which is compensated for by an interior tensile stress portion.

The capability of strengthening glasses and, in particular, glass-ceramic articles through ion exchange reactions has promoted extensive research aimed at strengthening conventional sintered ceramic articles in a like manner. However, such attempts have universally resulted in essentially no strengthening and, in many instances, effected physical disintegration of the sintered article. Thus, ion exchange could be carried out in sintered articles such that ions within the crystals and/or a glassy matrix phase were exchanged with different ions from an external source, but as a surface compression layer was developed the articles did not maintain their structural integrity. The fundamental cause for this disruption of dimensional integrity was deemed to be the inherent porosity of sintered ceramic articles. The pores behave as flaws within the body to relieve the stresses developed during the ion exchange reaction.

I have discovered that sintered ceramic articles within a particular composition area can be strengthened through an ion exchange reaction such that mechanical strengths greater than twice that exhibited by the original article can be attained. The ceramic articles operable in my invention consist essentially, in weight percent, of about 50–70% alumina and 26–50% nepheline syenite. In its most general terms, my invention comprises contacting a sintered ceramic article of such a composition with a source of potassium ions at an elevated temperature and for a sufficient length of time to cause the replacement of sodium ions with potassium ions in a surface layer of the article, this crowding in of the larger potassium ions for sodium ions creating an integral surface compression layer within the article and an interior tensile stress portion.

The production of sintered articles of alumina-nepheline syenite operable in my invention is disclosed in U.S. application Ser. No. 647,211, filed June 19, 1967, and reference is hereby made thereto. In general, such articles are composed of at least 88% of weight alumina-nepheline syenite with up to 10% by weight of kaolinitic clay and up to 2% by weight of a mineralizer such as MgO, talc, dolomite, $TiO_2$, or $Fe_2O_3$ with a microstructure consisting essentially of fine-grained crystals of alpha-alumina uniformly dispersed in a continuous glassy matrix. The grain size of the crystals is such that all are finer than 40 microns in diameter and the average diameter is about 3–6 microns. The articles when fired between about 1100°–1500° C. are essentially impervious to water with an internal porosity varying about 6–10%.

Table I records the batch compositions of several sintered articles suitable for the practice of the invention expressed in weight percent. In each example, the batch ingredients in powder form, i.e., less than about 100 Tyler mesh, were ball milled for 20 hours in the presence of 0.5%, based on the total of the batch materials, of zinc stearate as a grinding aid to yield a mixture wherein all the particles were less than 40 microns in diameter, 70% had a diameter less than 10 microns, and the average particle size was about 3–6 microns. This mixture was blended into molten paradichlorobenzene as a vehicle to which zinc stearate had been added as a deflocculant and a polyethylene glycol (Carbowax 20M) as a binder. This blended mass was cooled to a solid and then ground to a size suitable for use in a transfer press, viz, particles about ¼ inch in diameter. Test pieces in the form of rods about 3½" x ⅜" x ⅜" were formed in a transfer press operating at a pressure of about 5,000 p.s.i. The rods were placed in an oven fitted with an exhaust fan and retained therein at about 40° C. for 48 hours to effect substantially complete sublimation of the paradichlorobenzene. The test samples were then placed in an electrically-heated kiln and fired according to the following schedule: (1) heated at 400° C./hour to 600° C.; (2) heated at 300° C./hour to 1250° C.; (3) held at 1250° C. for two hours; and (4) cooled to room temperature by merely cutting off the electric power to the kiln and allowing the kiln to cool to room temperature with the rods inside, this cooling rate estimated to average about 150° C./hour.

TABLE I

| | 1 | 2 | 3 | 4 |
|---|---|---|---|---|
| Calcined $Al_2O_3$ | [1]66.7 | [1]66.7 | [1]66.7 | [1]66.7 |
| Nepheline syenite | [1]33.3 | [1]30.8 | [1]28.3 | [1]32.3 |
| Kaolin | | [1]2.5 | [1]5.0 | |
| Magnesiz | | | | [1]1.0 |

[1] Percent.

Since the articles contain a continuous glassy phase, it was appreciated that a measurement of the practical or useful strength of the articles could only be obtained after the articles had been subjected to abrasion simulating that received under actual service conditions. Hence, as is well-known in the art, the strength of glass with an undamaged fresh surface is very high. Thus, measured flexural strengths of several hundred thousand p.s.i. on freshly drawn glass fibers and rods have been obtained. Nevertheless, in actual practice, the modulus of rupture of ordinary commercial glassware averages about 5,000-10,000 p.s.i. In view of this, then, standard abrasion tests have been devised to provide a valid basis for the comparison of the strengths of various glasses as well as to simulate known types of service conditions. Each of these tests contemplates deliberately producing a multiplicity of abrasions, i.e., visible scratches or defects, in the surface of the glass article.

The rods of the present invention were subjected to a test referred to as tumble abrasion. Ten rods were placed in a Number 0 ball mill jar along with 200 cc. of 30 grit silicon carbide particles and tumbled for 15 minutes in the jar rotating at 90-100 r.p.m. Surface flaws produced by this technique simulate those received from a combination of rubbing abrasion and actual impacts.

That the sintered articles recorded in Table I are sensitive to abrasion is apparent from a comparison of modulus of rupture measurements made on freshly-sintered rods and on rods which had been subjected to tumble abrasion. Thus, rods of Examples 1, 2, and 3 averaged about 20,000 p.s.i. as made and of Example 4 about 22,000 p.s.i.; whereas, after tumble abrasion, rods of Examples 1, 2 and 3 averaged about 15,000 p.s.i. and of Example 4 about 14,000 p.s.i.

In carrying out the ion exchange reaction of my invention, I prefer to employ baths of molten potassium salts as sources of potassium ions although pastes and vapors containing potassium ions can be utilized successfully. Table II records the results of ion exchange strengthening. In each instance, a bath of molten $KNO_3$ was employed as the exchange medium. However, other potassium ion-containing salts which are molten, but do not decompose, at the required elevated temperature are suitable. The greatest strengths and the most rapid exchanges are achieved where pure potassium salts are utilized but some contamination thereof is tolerable. The highly mobile lithium and sodium ions are preferably absent from the potassium salt and should be held below about 2% by weight. In general, an exchange temperature between about 350°-650° C. is required to effect the replacement of sodium ions with potassium ions such as to produce high strength articles. At temperatures below about 350° C., the exchange becomes too slow to be of much practical interest; whereas at temperatures above about 650° C., the viscosity of the glass becomes low enough to permit stress release such that the crowding in of the larger ions will not produce a surface compression layer. The exchange time necessary to insure an exchanged surface layer of sufficient depth to withstand abrasion experienced by articles in normal service (simulated by the tumble abrasion test), such that the improvement in strength imparted to the article will be retained under service conditions, is directly dependent upon the exchange temperature employed. Thus, at the higher end of the exchange range, a time of only about ½ hour may be sufficient whereas at the lower extreme of this range, a time as long as 24 hours may be necessary. A depth of surface layer of at least 5 microns is required for more than nominal resistance to abrasion.

In each of the following treatments, the sintered articles were immersed into the $GNO_3$ bath operating at the cited temperatures and maintained therein for the specified periods of time. The rods were then removed from the batch, allowed to cool in air, and the adhering salt washed away with water. The modulus of rupture values recorded reflect an average of measurements made on five freshly-exchanged rods and on five similarly-exchanged rods which had been subsequently subjected to tumble abrasion.

TABLE II

| Example No. | Ion exchange treatment | Modulus of rupture (unabraded), p.s.i. | Modulus of rupture (abraded), p.s.i. |
|---|---|---|---|
| 1 | 350°C. for 24 [1] | 32,000 | 21,000 |
| 1 | 450°C. for 16 [1] | 38,000 | 28,000 |
| 1 | 525°C. for 6 [1] | 40,000 | 32,000 |
| 1 | 650°C. for 1 [1] | 33,000 | 23,000 |
| 2 | 450°C. for 16 [1] | 36,000 | 25,000 |
| 2 | 525°C. for 6 [1] | 41,000 | 29,000 |
| 3 | 450°C. for 16 [1] | 40,000 | 30,000 |
| 3 | 525°C. for 6 [1] | 39,000 | 28,000 |
| 4 | 450°C. for 16 [1] | 42,000 | 29,000 |
| 4 | 525°C. for 6 [1] | 40,000 | 29,000 |

[1] Hours.

This table amply illustrates the great effect which the ion exchange process of my invention has upon the mechanical strength of sintered ceramic articles having the above-cited compositions. The modulus of rupture measurements, determined in the conventional manner on the rod samples, also demonstrate that this tremendous improvement in mechanical strength is retained even after severe surface abrasion, thereby indicating that this strength increase is of great practical significance. Finally, this table illustrates that the temperature employed in the ion exchange is quite critical since at temperatures below about 350° C. and above about 650° C. the strength improvement begins to decrease sharply.

One area wherein these high strength materials have shown great promise has been in the dinnerware field, particularly as handles for knives, forks, and spoons as well as for the so-called accessory items such as salt and pepper shakers, cream pitchers, and sugar bowls.

The unique capability of the sintered ceramic articles of this invention to be strengthened through an ion exchange reaction is not completely understood. It cannot be explained on the basis of low porosity of the articles since many commercially-available, sintered ceramic products have even less porosity and, yet, these cannot be strengthened in like manner. However, it is believed safe to state that the intrinsic strength of these particular sintered articles is great enough to withstand the high stresses set up through the ion exchange reaction.

I claim:

1. A sintered ceramic article of high strength having an integral surface compressive stress layer and an interior tensile stress portion consisting essentially, by weight, of about 50-70% alumina and 26-50% nepheline syenite, the total of the alumina and nepheline syenite constituting about 88-100% of the article, 0-10% kaolinitic clay, and 0-2% of a mineralizer and structurally comprising crystals of alumina uniformly dispersed in a nepheline syenite glass continuous phase, said glass phase containing sodium and potassium ions such that the concentration of the potassium ions is greater in the surface layer than in the interior portion and the concentration of the sodium ions is greater in the interior portion than in the surface layer, said differences in concentration creating said compressive stress.

2. A sintered ceramic article according to claim 1 wherein said compressively stressed surface layer is at least 5 microns in depth.

3. A method for making a sintered ceramic article of high strength having an integral surface compressive stress layer at least 5 microns in depth and an interior tensile stress portion consisting essentially, by weight, of about 50–70% alumina and 26–50% nepheline syenite, the total of the alumina and nepheline syenite constituting about 88–100% of the article, 0–10% kaolinitic clay, and 0–2% of a mineralizer and structurally comprising crystals of alumina uniformly dispersed in a nepheline syenite glass continuous phase characterized by contacting said article with a material containing potassium ions at a temperature between about 350°–650° C. for a period of time sufficient to replace at least part of the sodium ions of the nepheline syenite glass in a surface layer on the article with potassium ions to effect an integral compressively stressed surface layer on the article.

4. A method according to claim 3 wherein said time sufficient to replace at least part of the sodium ions of the nepheline syenite glass in the surface layer with potassium ions ranges between about ½–24 hours.

References Cited
UNITED STATES PATENTS

| | | | |
|---|---|---|---|
| 2,887,394 | 5/1959 | Bickford et al. | 106—46 |
| 2,898,217 | 8/1959 | Selsing | 106—46 |
| 2,920,971 | 1/1960 | Stookey | 106—39 |
| 3,357,876 | 12/1967 | Rinehart | 161—1 |
| 3,384,508 | 5/1968 | Bopp et al. | 117—123 |
| 3,463,647 | 8/1969 | Kosiorek et al. | 106—48 |

OTHER REFERENCES

Nordberg, M. E.; Mochel, E. L.; Garfinkel, H. M.; and Olcott, J. S.: Strengthening by Ion Exchange, in J. Amer. Cer. Soc., 47 (1964), pp. 215–219.

Ceramic Raw Materials, in Ceramic Industry Magazine, 86, Chicago (Cahuers Publ.), January 1966, p. 128.

HELEN M. McCARTHY, Primary Examiner

W. R. SATTERFIELD, Assistant Examiner

U.S. Cl. X.R.

65—30; 106—39, 45